United States Patent [19]

Okamoto et al.

[11] 4,439,701
[45] Mar. 27, 1984

[54] ROTOR OF A SUPERCONDUCTIVE ROTARY ELECTRIC MACHINE

[75] Inventors: Kouichi Okamoto, Kobe; Masaki Sakuyama, Ashiya; Tadatoshi Yamada, Kobe; Shiro Nakamura, Takarazuka, all of Japan

[73] Assignee: Mitsubishi Denki Kabushiki Kaisha, Tokyo, Japan

[21] Appl. No.: 381,726

[22] Filed: May 24, 1982

[30] Foreign Application Priority Data

May 29, 1981 [JP] Japan .................. 56-84143

[51] Int. Cl.³ .............................................. H02K 15/12
[52] U.S. Cl. ........................................ 310/45; 310/52; 310/215; 310/270
[58] Field of Search ............... 310/10, 52, 61, 64, 310/43, 45, 214, 215, 270; 336/199, 205

[56] References Cited

U.S. PATENT DOCUMENTS

| | | | |
|---|---|---|---|
| 4,001,616 | 1/1977 | Lonseth | 310/45 |
| 4,239,998 | 12/1980 | Hakamada | 310/215 |
| 4,275,324 | 6/1981 | Flick | 310/214 |
| 4,282,450 | 8/1981 | Eckels | 310/45 |
| 4,345,175 | 8/1982 | Jones | 310/45 |
| 4,368,399 | 1/1983 | Ying | 310/270 |

FOREIGN PATENT DOCUMENTS

| | | |
|---|---|---|
| 51-150402 | 12/1976 | Japan . |
| 54-113808 | 9/1979 | Japan . |
| 56-46706 | 11/1981 | Japan . |
| 57-13961 | 1/1982 | Japan . |

Primary Examiner—R. Skudy
Attorney, Agent, or Firm—Wenderoth, Lind & Ponack

[57] ABSTRACT

A rotor of a superconductive rotary electric machine is disclosed in which fillers are inserted between the superconductive magnetic field coils and a plurality of padding plates which cover the entire side face of the superconductive field coils so that all the turns of the superconductive magnetic field coils are firmly secured. The rotor therefore can be stably operated.

2 Claims, 8 Drawing Figures

ROTOR OF A SUPERCONDUCTIVE ROTARY ELECTRIC MACHINE

BACKGROUND OF THE INVENTION

The present invention relates to a structure of the rotor of a superconductive rotary electric machine.

An example of a conventional rotor of a superconductive rotary electric machine is shown in FIG. 1. The figure illustrates one end of a coil-carrying shaft 2 for the stator and the end portions of the superconductive magnetic field coils 3. Reference numeral 2 denotes the coil-carrying shaft; 16 the coil end keeper sleeve; 21 an electrically insulating layer; 22 an insulating cover; and 23 electrically insulating fillers.

FIG. 2 is a perspective view showing the end of the coil-carrying shaft 2 for an easy understanding of FIG. 1. Like numerals represent like parts.

In FIGS. 1 and 2 the superconductive field coils 3 are accommodated in the recessed portion of the coil-carrying shaft 2 and the spaces between the coils 3 and recessed portion are filled by the fillers 23. The keeper sleeve 16 is tightly fitted around the coil-carrying shaft 2 by a shrinkage fit method to press against the entire periphery of the shaft 2 so that the field coils 3 are very firmly kept in the correct positions.

The conventional electrically insulating fillers 23 which extend in an axial and circumferential directions of the coil-carrying shaft 2 are tightly engaged with the shaft 2 as shown in FIGS. 1 and 2. Accordingly the following problems are encountered when the electrically insulating fillers 23 are inserted into gaps between the superconductive magnetic field coils 3 and into gaps between the superconductive field coils 3 and the coil-carrying shaft 2.

One superconductive magnetic field coil 3 comprises a plurality of turns. The turns are electrically from each other. The electric insulation is accomplished by means of electrically insulating tapes wound on the coil conductors in a spiral manner. The insulating tapes are subject to insulation-breakdown when the insulating fillers 23 are inserted. The insulation breakdown of the tapes between turns of coil may cause short circuiting of the coils, resulting in the stopping of the operation of the rotary machine. When the gaps between the insulating fillers 23 and the superconductive field coils 3 at the outer periphery are smaller than those at the inner periphery, gaps are formed between the under side face of the superconductive field coils 3 and the insulating fillers 23, resulting in loose fitting of the under portion of the superconductive field coil 3. In such circumstance, the superconductive field coils are displaced due to the electromagnetic and centrifugal forces during the operation so that frictional heat is generated, which may hinder the operation of the rotary electric machine.

FIG. 3 shows an alternative conventional arrangement in which insulating fillers are divided into a plurality of padding plates which are mounted to cover the sides of the superconductive field coils and the filler portions. The insulating padding plates 23a cover the entire side faces of the superconductive field coils 3 and the filler portions 23b are provided in the other positions. After the superconductive field coils 3 have been mounted on the coil-carrying shaft 2, the sides of the superconductive field coils 3 are covered by the insulating padding plates 23a, then the insulating fillers 23b are inserted. The superconductive field coils 3 are firmly secured without breaking the insulation between respective turns of the superconductive field coils 3 by the aforementioned method of the assembly.

However the aforementioned arrangement still has the following disadvantages. It is impossible to secure the superconductive field coils 3 so that the sides of the field coils 3 are not flush with each other no matter how carefully carried out in the securing of the superconductive field coils 3 to the coil-carrying shaft 2. Accordingly all the turns of the superconductive field coils 3 are firmly pressed by the padding plates 23a.

SUMMARY OF THE INVENTION

The present invention seeks to overcome the disadvantages of the conventional structure of the rotor of the superconductive rotary electric machine. The superconductive magnetic field coils which are provided in a longitudinal direction of the coil-carrying shaft are bent at a normal angle at the end thereof. The end portions of the superconductive field coils which are curved along the circumference of the coil-carrying shaft may be firmly secured. At the end portions of the superconductive field coils, electrically insulating padding plates 23a are applied to the sides of the superconductive field coils with electrically insulating filler sheets therebetween. The electrically insulating fillers 23b are then packed in the space between adjacent padding plates 23a so that the gaps are not formed within the keeper sleeve fitted on the outer side of the coil end portion. Thus the rotor is securedly assembled.

BRIEF DESCRIPTION OF THE INVENTION

In the drawings, like reference numerals and characters represent like or corresponding parts.

DETAILED DESCRIPTION OF THE PREFERRED EMBODIMENT

Figure 4:
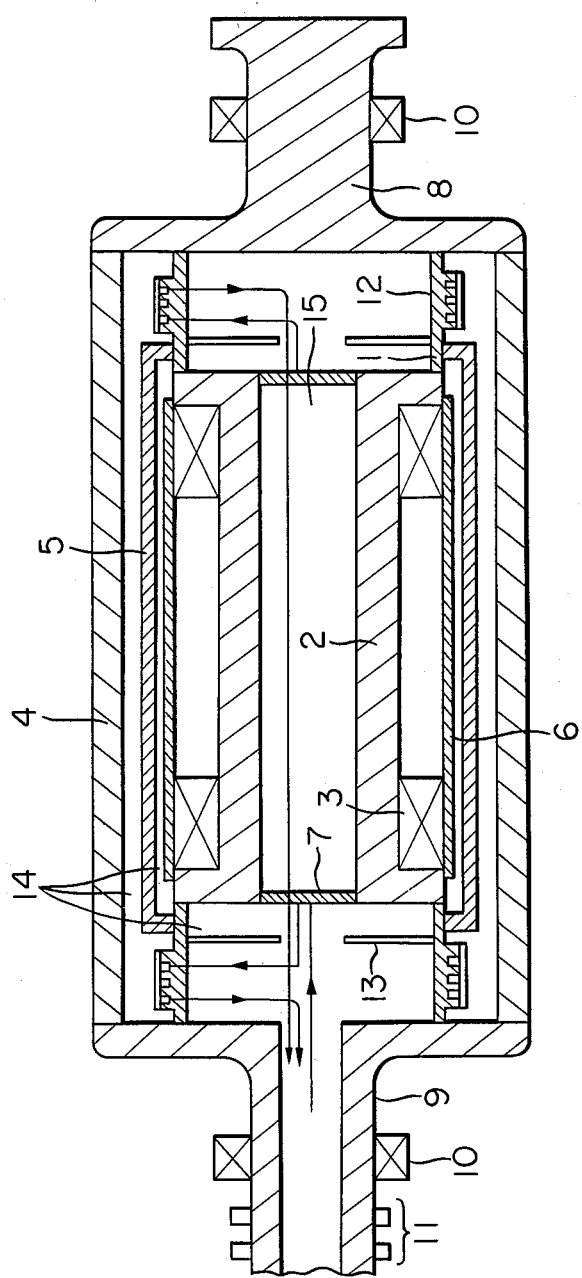
FIG. 4 is an axial sectional view showing the general structure of the rotor of a superconductive rotary electric machine.

The general structure of the rotor of a superconductive rotary electric machine will be described with reference to FIGS. 4 to 6 prior to the detailed description of the rotor of the present invention. In FIG. 4 reference numeral 1 denotes torque tubes; 2 a coil-carrying shaft which forms the central portion of the torque tubes 1; 3 superconductive field coils mounted on the coil-carrying shaft 2; 4 an outer housing including a normal temperature damper enclosing the torque tubes 1 and the coil-carrying shaft 2; 5 a low temperature damper which is disposed between the normal temperature damper 4 and the coil-carrying shaft 2; 6 cylindrical helium container outer wall which is disposed on the outer periphery of the coil-carrying shaft 2 and helium end plates 7 which are disposed at the ends of the shaft 2 respectively; 8 and 9 driving and an driven end shafts at the opposite ends of the shaft 2 respectively; 10 bearings which support the end shafts 8 and 9; 11 slip rings for supplying the field current to the coils 3; 12 a heat exchanger which is provided in the torque tubes 1; 13 side radiation shields; 14 a vacuum portion; and 15 a liquid helium container.

In an arrangement of the rotor of the superconductive rotary electric machine, the superconductive field coils 3 mounted on the coil-carrying shaft 2 are cooled below the transition temperature in the neighbourhood of a few degrees above absolute zero. Thus the electrical resistance between vanishingly small so that large magnetic fields are established without the expenditure of appreciable amounts of electrical energy. Under such conditions alternating electrical power is generated in a stator (not shown). Liquid helium is supplied to the helium container 15 defined by the motor wall 6 and end plates 7 through a conduit (not shown) in the shaft 9 for cooling the superconductive field coils 3 to minimum temperatures, while the vacuum portions 14 within the rotor are kept at a vacuum. The torque tubes which transmit the rotary torque to the superconductive field coils 3 and the coil-carrying shaft 2 are in the form of a thin-walled hollow cylinder and the heat exchanger 12 is provided so that outside heat entering into the super-low temperature portion through the torque tubes 1 is substantially reduced. Such an arrangement is common. Furthermore the side radiation shields 13 are provided for reducing the entering heat due to the radiation from the side.

On the other hand, the normal and low temperature dampers 4 and 5 shield the high frequency magnetic fields generated in the stator (not shown) and protect the superconductive field coils 3 therefrom. The dampers 4 and 5 have the further functions of attenuating the vibration of the rotor caused by the perturbations of the electrical system. The normal temperature damper 4 also functions as the outer cylinder of the vacuum portion 14, and the low temperature damper 5 functions as the radiation shield which prevents radiation heat from entering into the helium container 15. It should be noted that in FIG. 4, the piping within the rotor for supplying liquid helium to the containers 15 and for exhausting helium therefrom, and the means for supplying and exhausting helium to and from the rotor are omitted.

It is of paramount importance to securely mount the coils to the rotor, for the displacement of the superconductive field coils due to the movement of the rotor may generate frictional heat which destroys the superconductivity of the field coils. It is apparent from FIG. 4 that the checking and repairing of the superconductive field coils 3 is difficult to carry out since the field coils 3 are triple-enclosed by the outer wall 6, and low temperature and normal dampers 5 and 4. In particular the superconductive magnetic field coils 3 should be securely mounted since a rotary electric machine requires high reliability.

Figure 5:
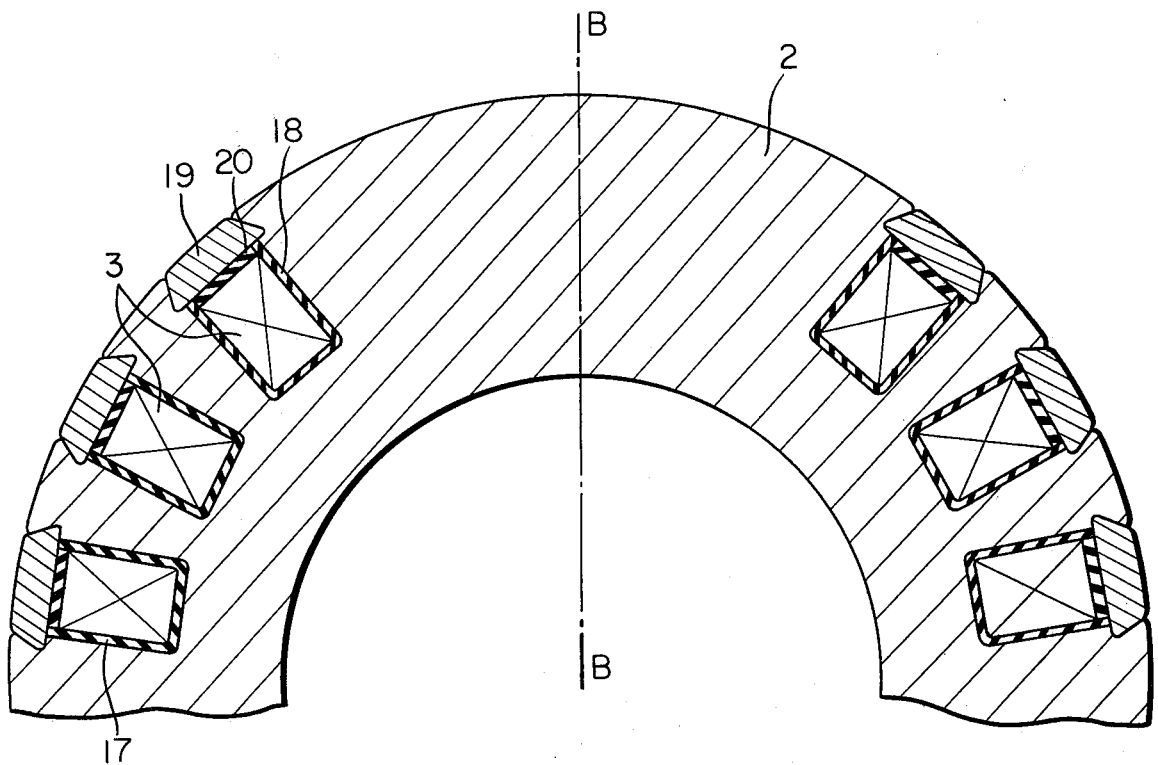
FIG. 5 is a transverse sectional view for the illustration of the disadvantages of the mounting structure for the superconductive field coils.

In FIG. 5 showing a general arrangement for supporting the field coils 3, reference numeral 2 denotes the coil-carrying shaft; 17 grooves which are formed in an axial direction on the surface of the coil-carrying shaft 2; 3 the superconductive magnetic coils in the grooves 17; 20 insulators for wedges 19. In FIG. 5 the superconductive magnetic field coils 3 are wound around the line B—B, and thus a strong magnetic field is established which has a polar axis corresponding to the line B—B. The wedges 19 are fitted in the grooves 17 to firmly hold the superconductive magnetic field coils 3 therein. There are however the following disadvantages in the fabrication of the rotor having an arrangement where the ends of the superconductive magnetic field coils 3 are also held in the grooves by such wedges.

Figure 6:
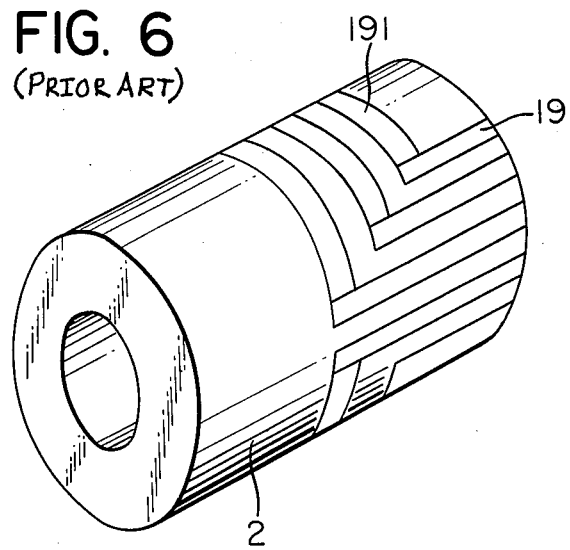
FIG. 6 is a perspective view for illustration of the mounting structure shown in FIG. 5.

FIG. 6 is a perspective view showing one end of the coil-carrying shaft 2. In this figure, reference numeral 2 denotes the coil-carrying shaft; 19 the wedges for the straight portions of the superconductive magnetic field coils 3; and 191 the wedges for the ends of the superconductive magnetic field coils 3.

It is apparent from the FIG. 6 that the wedges 191 should have a curved cross-section since the end portions of the superconductive magnetic field coils 3 are curved to run in the circumferential direction of the coil-carrying shaft 2. Furthermore the grooves under the curved wedges 191 have the form of portions of an annulus, which is impossible to machine lathe. The fact that the end portions of the wedges 191 and the grooves have more complicated forms in comparison to the straight portions of the superconductive magnetic field coils 3 not only results in an increase in the time and cost required in machining, but also decreases the precision thereof, thereby endangering the secureness of the mounting of the superconductive field coil 3 on the coil-carrying shaft 2.

Figure 1:
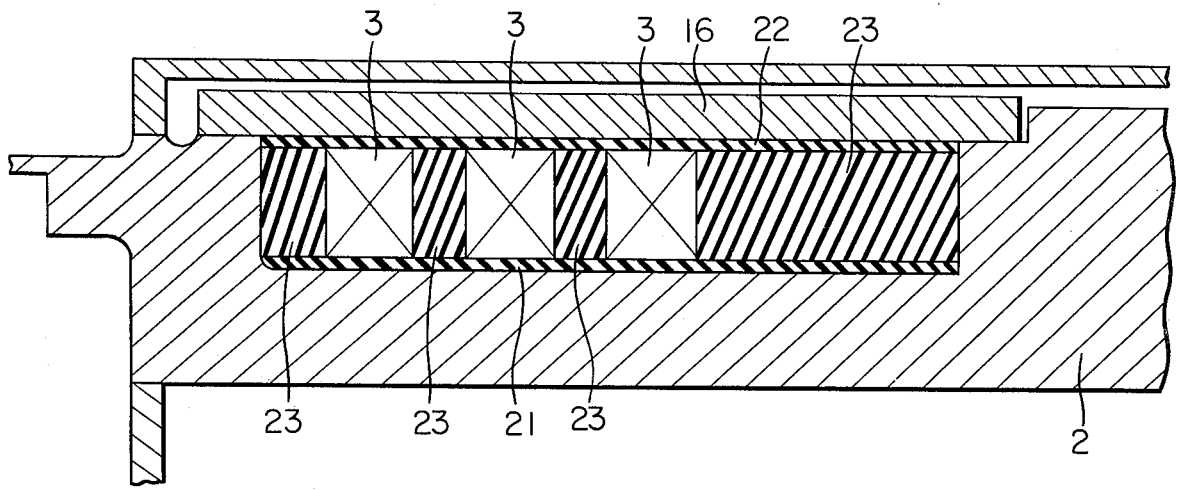
FIG. 1 is an axial sectional view showing the end portions of the superconductive magnetic field coils in one example of a conventional rotor of the superconductive rotary electric machine.
Figure 2:
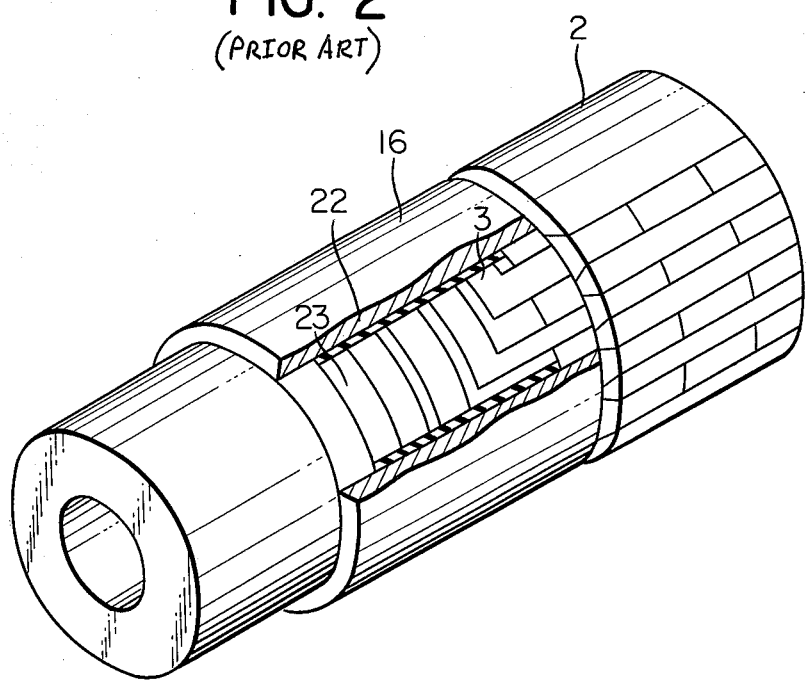
FIG. 2 is a perspective view, partly broken away, of the illustration of the general structure shown in FIG. 1.
Figure 3:
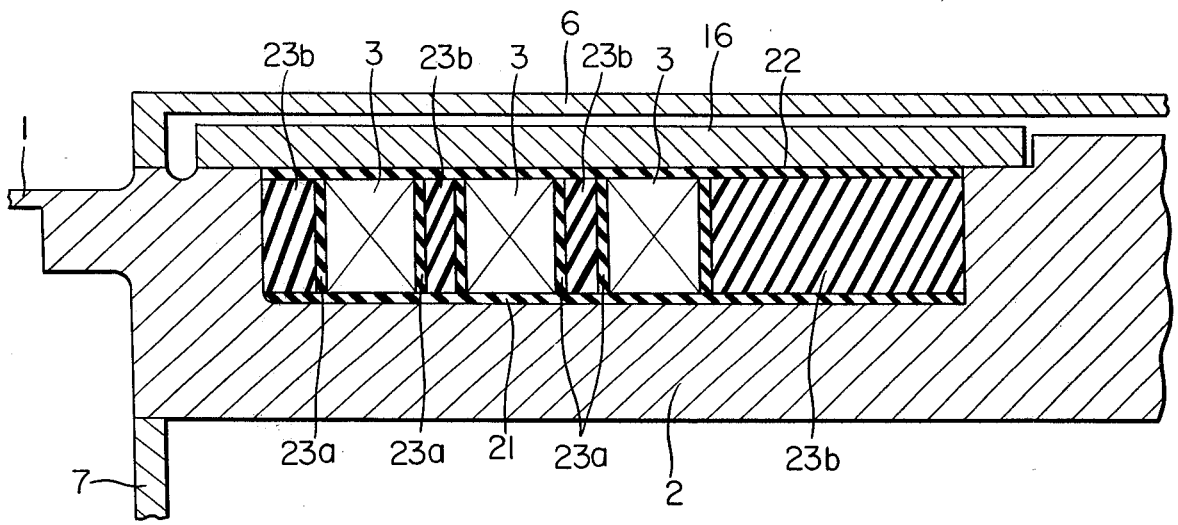
FIG. 3 is an axial sectional view showing another example of the conventional structure.

The arrangements shown in FIGS. 1 to 3 which have been proposed in order to overcome with disadvantage, however still have the disadvantages which have been described.

The present invention seeks to provide means to securely hold the curved end portions of the superconductive coils, which is a weak point of the conventional structure.

Figure 7:
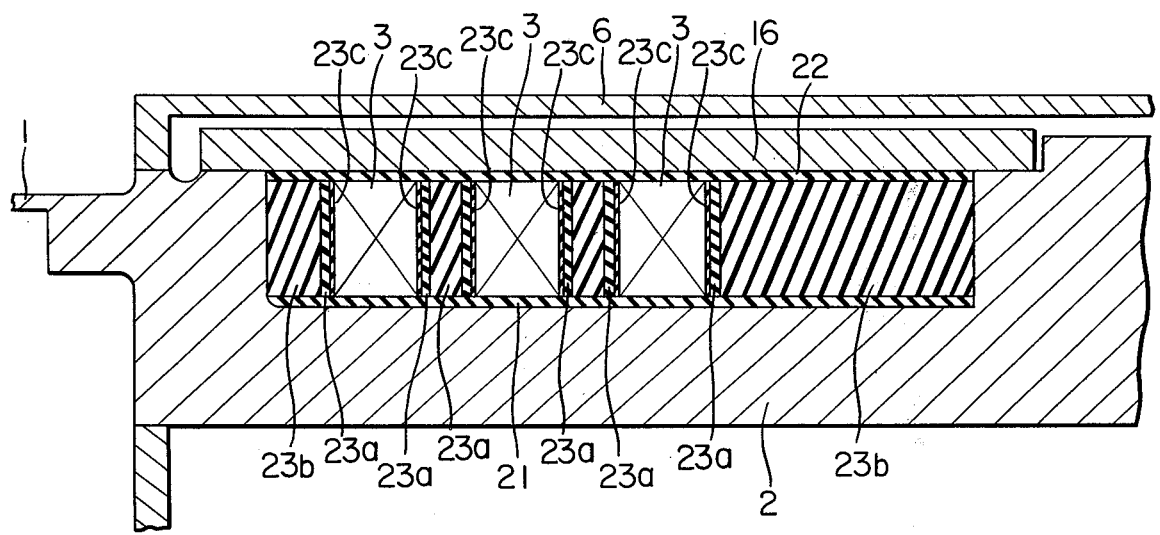
FIG. 7 is an axial sectional view for illustration of the structure of the rotor of the present invention.
Figure 8:
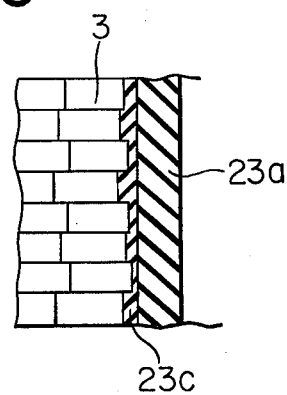
FIG. 8 is an enlarged sectional view of part of the rotor FIG. 7.

An embodiment of the present invention will be described with reference to the FIGS. 7 and 8. In these figures, electrically insulative filler sheets 23c which are made of elastic material such as felt and the like are inserted between the superconductive field coil 3 and the electrically insulative padding plates 23a.

For assembly, the electrically insulating filler sheets 23c are first applied to the sides of the superconductive field coils 3 after the coils 3 have been mounted on the coil-carrying shaft 2. The padding plates 23a are then applied to the filler sheets 23c. Finally the filler portions 23b are inserted between spaced opposed padding plates. The electrically insulative filler sheets 23c may have an irregular contour at the side thereof corresponding to the side of the superconductive magnetic field coils 3 as shown in FIG. 8.

Felt which has been impregnated with a resin may be used as electrically insulating filler sheets 23c, which make it possible to more firmly secure the superconductive magnetic field coils 3 to the coil-carrying shaft 2.

As described above, the present invention provides a rotor in which the superconductive field coils which are formed in a longitudinal direction of the coil-carrying shaft are bent at an angle normal thereto at the end thereof, electrically insulating padding plates are applied over insulating filler sheets on the opposite sides of the coils and electrically insulating fillers are inserted between spaced opposed passing plates to prevent the formation of a gap within the keeper sleeve which is mounted over the end of the coils.

What we claimed is:

1. A rotor for a superconductive rotary electric machine comprising:

a coil carrying shaft;

a plurality of superconductive magnetic field coil means mounted on said coil carrying shaft and having coil end portions which are curved along the circumference of an end portion of the coil carrying shaft, said coil end portions being spaced in the direction of the length of said shaft to define gaps between the coil end portions;

electrically insulating filler sheets against the side surfaces of said coil end portions on opposite sides of said gap, said sheets being an elastic material impregnated with an electrically insulating resin and having the side against the coil end portion conforming to the shape of the coil end portion;

electrically insulating padding plate means applied over the electrically insulating filler sheets; and electrically insulating filler means filling the remainder of said gaps between said padding plate means.

2. A rotor as claimed in claim 1 in which the elastic material is felt.

* * * * *